United States Patent
Frost et al.

(10) Patent No.: US 8,562,879 B2
(45) Date of Patent: *Oct. 22, 2013

(54) INORGANIC FIBER WEBS AND METHODS OF MAKING AND USING

(75) Inventors: George W. Frost, Afton, MN (US); James P. Endle, New Richmond, WI (US); Lahoussaine Lalouch, Picardie (FR)

(73) Assignee: 3M Innovative Properties Company, St. Paul, MN (US)

( * ) Notice: Subject to any disclaimer, the term of this patent is extended or adjusted under 35 U.S.C. 154(b) by 311 days.

This patent is subject to a terminal disclaimer.

(21) Appl. No.: 13/079,885

(22) Filed: Apr. 5, 2011

(65) Prior Publication Data

US 2011/0250461 A1    Oct. 13, 2011

Related U.S. Application Data

(60) Provisional application No. 61/323,474, filed on Apr. 13, 2010.

(51) Int. Cl.
*D04H 5/02* (2012.01)
(52) U.S. Cl.
USPC ............ 264/113; 264/115; 264/121; 264/122
(58) Field of Classification Search
None
See application file for complete search history.

(56) References Cited

U.S. PATENT DOCUMENTS

| | | | |
|---|---|---|---|
| 4,116,656 A | 9/1978 | Mukai | |
| 4,199,336 A | 4/1980 | Rittler | |
| 4,273,821 A | 6/1981 | Pedlow | |
| 4,600,634 A | 7/1986 | Langer | |
| 4,640,810 A | 2/1987 | Laursen | |
| 4,724,114 A * | 2/1988 | McFarland et al. | 264/510 |
| 4,808,097 A | 2/1989 | Takahashi | |
| 5,094,791 A * | 3/1992 | Nopper | 264/112 |
| 5,123,949 A | 6/1992 | Thiessen | |
| 5,232,638 A | 8/1993 | Thiessen | |
| 5,290,522 A | 3/1994 | Rogers | |
| 5,302,445 A * | 4/1994 | DePetris et al. | 442/57 |

(Continued)

FOREIGN PATENT DOCUMENTS

| EP | 0 643 204 | 3/1995 |
|---|---|---|
| EP | 0 989 103 | 3/2000 |

(Continued)

OTHER PUBLICATIONS

International Search Report, PCT/US2009/062188, mailed Jun. 4, 2010, 4 pages.

(Continued)

*Primary Examiner* — Mary F Theisen
(74) *Attorney, Agent, or Firm* — Kenneth B. Wood (57) ABSTRACT

Methods are disclosed in which two or more forming chambers are used to process inorganic fibers by gravity-laying methods. The methods may comprise using a first forming chamber to open inorganic fibers and using a second forming chamber to process the opened inorganic fibers, optionally to blend the opened inorganic fibers with additional inorganic fibers and/or with particulate additives, and to collect the inorganic fibers as a mat. The methods may comprise using a first forming chamber to form a first inorganic fiber layer and a second forming chamber to form a second inorganic fiber layer, and consolidating the first and second inorganic fiber layers so as to provide a multilayer gravity-laid inorganic fiber web.

15 Claims, 3 Drawing Sheets

(56) References Cited

U.S. PATENT DOCUMENTS

| | | |
|---|---|---|
| 5,464,952 A | 11/1995 | Shah |
| 6,051,193 A | 4/2000 | Langer |
| 6,233,787 B1 | 5/2001 | Eriksen |
| 7,018,699 B2 | 3/2006 | Dykhoff |
| 2003/0022577 A1 | 1/2003 | Kim |
| 2004/0147184 A1 | 7/2004 | Taylor, Jr. |
| 2005/0098910 A1 | 5/2005 | Andersen |
| 2006/0085951 A1 | 4/2006 | Celli |
| 2006/0154040 A1 | 7/2006 | Merry |
| 2006/0182915 A1 | 8/2006 | Frost |
| 2006/0257298 A1 | 11/2006 | Merry |
| 2008/0160857 A1 | 7/2008 | Chacko |
| 2009/0227706 A1 | 9/2009 | Hansen |

FOREIGN PATENT DOCUMENTS

| | | |
|---|---|---|
| EP | 1 486 648 | 12/2004 |
| EP | 1 696 110 | 8/2006 |
| EP | 1 736 644 | 12/2006 |
| FR | 2 436 757 | 4/1980 |
| JP | 2008 045239 | 2/2008 |
| WO | WO 97/20781 | 6/1997 |
| WO | WO 97/36833 | 10/1997 |
| WO | WO 2004/031544 | 4/2004 |
| WO | WO 2005/044529 | 5/2005 |
| WO | WO 2005/098910 | 10/2005 |
| WO | WO 2006/085951 | 8/2006 |
| WO | WO 2007/044485 | 4/2007 |
| WO | WO 2008/145131 | 12/2008 |
| WO | WO 2009/048857 | 4/2009 |
| WO | WO 2009/048859 | 4/2009 |
| WO | WO 2009/087236 | 7/2009 |

OTHER PUBLICATIONS

International Search Report, PCT/US2009/062193, mailed Mar. 30, 2010, 3 pages.
International Search Report, PCT/US2011/031146, mailed Dec. 28, 2011, 4 pages.
International Search Report, PCT/US2011/031195, mailed Dec. 28, 2011, 5 pages.
International Search Report, PCT/US2011/031155, mailed Dec. 27, 2011, 3 pages.
International Search Report, PCT/US2011/031164, mailed Dec. 27, 2011, 5 pages.
FormFiber Denmark ApS-SPIKE AirCarding Technical Information, Distributed during INTC 2008 International Nonwovens Technical Conference, Houston, TX, Sep. 8, 2008.
U.S. Appl. No. 13/127,194, Anne Nathalie de Rovere, filed Oct. 27, 2009.
U.S. Appl. No. 13/127,193, Anne Nathalie de Rovere, filed Oct. 27, 2009.
FormFiber Denmark ApS-SPIKE AirCarding Technical Information, Distributed during INTC 2008 International Nonwovens Technical Conference, Houston, TX, Sep. 8, 2011.
U.S. Appl. No. 13/080,060, Lahoussaine LaLouch, filed Apr. 5, 2011.
U.S. Appl. No. 13/079,911, James P. Endle, filed Apr. 5, 2011.

* cited by examiner

INORGANIC FIBER WEBS AND METHODS OF MAKING AND USING

CROSS-REFERENCE TO RELATED APPLICATION

This application claims priority to U.S. Provisional Patent Application No. 61/323,474, filed Apr. 13, 2010, the disclosure of which is incorporated by reference herein in its entirety.

BACKGROUND

Wet-laid and dry-laid webs comprising inorganic fibers have been known for years and have been used in a wide variety of applications, particularly those involving resistance to elevated temperatures.

SUMMARY

Methods are disclosed in which two or more forming chambers are used to process inorganic fibers by gravity-laying methods. The methods may comprise using a first forming chamber to open inorganic fibers and using a second forming chamber to process the opened inorganic fibers, optionally to blend the opened inorganic fibers with additional inorganic fibers and/or with particulate additives, and to collect the inorganic fibers as a mat. The methods may comprise using a first forming chamber to form a first inorganic fiber layer and a second forming chamber to form a second inorganic fiber layer, and consolidating the first and second inorganic fiber layers so as to provide a multilayer gravity-laid inorganic fiber web.

Thus in one aspect, herein is disclosed a method of making a gravity-laid inorganic fiber web, comprising: introducing inorganic fibers into a first forming chamber that comprises a plurality of first fiber-separating rollers provided in at least one row within the first forming chamber and that comprises a first moving endless belt screen; mechanically separating at least some of the inorganic fibers with the first fiber-separating rollers; capturing any remaining agglomerates of the inorganic fibers by the first moving endless belt screen and returning the captured agglomerates to the first fiber-separating rollers to be mechanically separated by the first fiber-separating rollers; collecting the mechanically separated inorganic fibers; introducing at least some of the collected mechanically separated inorganic fibers into a second forming chamber that comprises a plurality of second fiber-separating rollers provided in at least one row within the second forming chamber and that comprises a second moving endless belt screen; mechanically separating at least some of the inorganic fibers with the second fiber-separating rollers of the second forming chamber; capturing any remaining agglomerates of the inorganic fibers by the second moving endless belt screen and returning the captured agglomerates to the second fiber-separating rollers to be mechanically separated by the second fiber-separating rollers; collecting the mechanically separated inorganic fibers as a gravity-laid inorganic fiber mat; removing the gravity-laid inorganic fiber mat from the second forming chamber; and, consolidating the gravity-laid inorganic fiber mat to form a gravity-laid inorganic fiber web.

Thus in another aspect, herein is disclosed a method of making a multilayer gravity-laid inorganic fiber web, comprising: introducing first inorganic fibers into a first forming chamber that comprises a plurality of first fiber-separating rollers provided in at least one row within the first forming chamber and that comprises a first moving endless belt screen; mechanically separating at least some of the first inorganic fibers with the first fiber-separating rollers; capturing any remaining agglomerates of the first inorganic fibers by the first moving endless belt screen and returning the captured agglomerates to the first fiber-separating rollers to be mechanically separated by the first fiber-separating rollers; collecting the mechanically separated first inorganic fibers as a first gravity-laid inorganic fiber mat layer; removing the first gravity-laid inorganic fiber mat layer from the first forming chamber; introducing the first gravity-laid inorganic fiber mat layer into a second forming chamber, on a carrier at the bottom of the second forming chamber; introducing second inorganic fibers into the second forming chamber, wherein the second forming chamber comprises a plurality of second fiber-separating rollers provided in at least one row within the second forming chamber and that comprises a second moving endless belt screen; mechanically separating at least some of the second inorganic fibers with the second fiber-separating rollers of the second forming chamber; capturing any remaining agglomerates of the second inorganic fibers by the second moving endless belt screen and returning the captured agglomerates to the second fiber-separating rollers to be mechanically separated by the second fiber-separating rollers; collecting the mechanically separated second inorganic fibers as a second gravity-laid inorganic fiber mat layer atop the first gravity-laid inorganic fiber mat layer, to form a multilayer gravity-laid inorganic fiber mat; removing the multilayer gravity-laid inorganic fiber mat from the second forming chamber; and, consolidating the first gravity-laid inorganic fiber mat layer and the second gravity-laid inorganic fiber mat layer to respectively form first and second gravity-laid inorganic web layers of a multilayer gravity-laid inorganic fiber web.

Thus in another aspect, herein is disclosed a multilayer inorganic fiber web comprising a first gravity-laid inorganic fiber web layer of a first composition and with first and second oppositely-facing major surfaces; and, a second gravity-laid inorganic fiber web layer of a second composition and with first and second oppositely-facing major surfaces, wherein the first and second gravity-laid inorganic web layers are bonded together.

These and other aspects of the invention will be apparent from the detailed description below. In no event, however, should the above summaries be construed as limitations on the claimed subject matter, which subject matter is defined solely by the attached claims, as may be amended during prosecution.

Like reference numbers in the various figures indicate like elements. Some elements may be present in identical or equivalent multiples; in such cases only one or more representative elements may be designated by a reference number but it will be understood that such reference numbers apply to all such identical elements. Unless otherwise indicated, all

DETAILED DESCRIPTION

Figure 1:
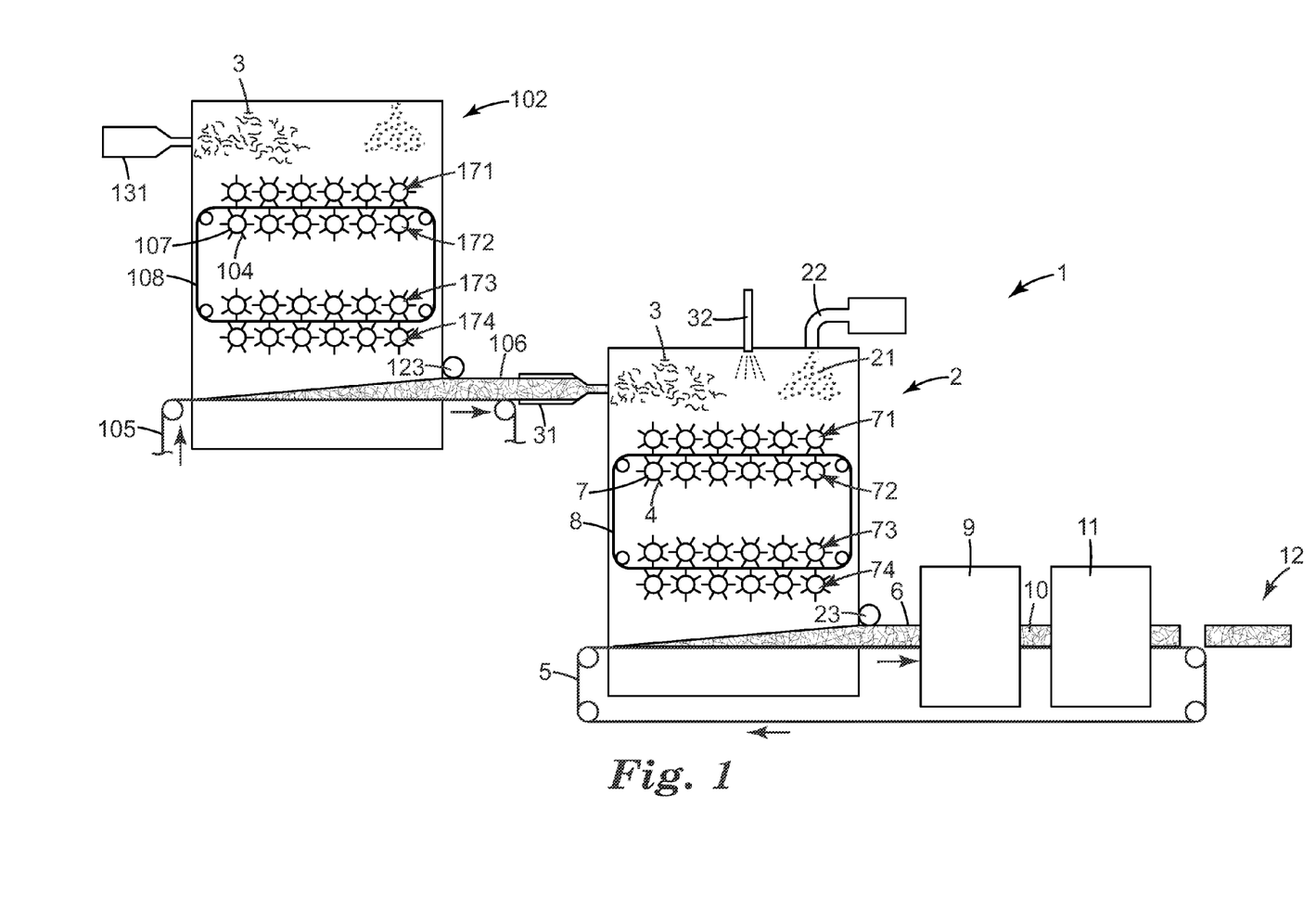
FIG. 1 shows a schematic side view of an exemplary process that can use two forming chambers to make a gravity-laid inorganic fiber web.

Disclosed herein are processes and apparatus that can make gravity-laid inorganic fiber webs, by the use of two forming chambers. FIG. 1 is a side view showing, in one embodiment, an exemplary apparatus 1 and process that can use forming chambers 2 and 102 (both shown in cutaway) to make a gravity-laid inorganic fiber web 10. Inorganic fibers 3 (which may include clumps, agglomerates of large numbers of fibers, and the like) are introduced into forming chamber 102, e.g. by way of fiber input device 131.

Within first forming chamber 102, inorganic fibers 3 are mechanically separated (e.g., partially, mostly, or nearly completely, de-agglomerated) into individual fibers and/or groups of a few fibers or less. This is accomplished by rotating fiber-separating rollers 107 each of which comprises protrusions 104 (referred to by the general term spikes, although they may be of any suitable design). The spikes 104 of adjacent rollers 107 are in intermeshing relation (although they typically do not contact each other), and so can apply shear force to agglomerates of fibers 3 (particularly when an agglomerate is momentarily caught between two moving, e.g. counter-rotating, spikes) and at least partially separate the agglomerates into individual fibers or into agglomerates of smaller numbers of fibers. In some embodiments, fiber-separating rollers 107 may be present as an upper set of roller rows 171 and 172, and a lower set of roller rows 173 and 174, as shown in FIG. 1. Those of ordinary skill in the art will appreciate that the design and operating parameters of forming chamber 2 and fiber-separating rollers 7 therein, may be manipulated in consideration of the particular composition and/or properties of the fibers to be processed therein. For instance, any or all of the spacing of the rollers, the spike length, the spike spacing along the rollers and around the rollers, the degree of intermeshing of the spikes, the speed of rotation of the various rollers, the direction of rotation of the various rollers, and the like, may be varied e.g. in order to increase the residence time of certain fibers within chamber 2, to enhance the amount of mechanical separation of the fibers, and the like. The action of the fiber-separating rollers may be enhanced by optional air streams, e.g. by the use of (optional) air nozzles appropriately located in forming chamber 102, that may cause fiber agglomerates to tumble and/or to recirculate within forming chamber 102. (It is noted that while the term air is used herein, the term is used in its broadest meaning and can encompass the use of any suitable gaseous fluid).

Agglomerates of fibers and/or individual fibers will eventually fall downward, under the influence of gravity, within forming chamber 102. Forming chamber 102 comprises endless belt screen 108 (which may e.g. pass through upper set of fiber-separating roller rows 171 and 172 and through lower set of fiber-separating roller rows 173 and 174 generally as shown in FIG. 1). Endless belt screen 108 may comprise through-holes of a desired size or mixture of sizes. Accordingly, fiber agglomerates, clumps or the like, if present and if greater than a certain size, may be captured by endless belt screen 108 and recirculated within forming chamber 102 so as to pass through one or both of the sets of fiber-separating rollers for additional mechanical separation (e.g., de-agglomeration). The use of a forming chamber for this type of processing of inorganic fibers is described in further detail in PCT Published Application WO 2009/048859, the disclosure of which is herein incorporated by reference.

The mechanically separated fibers that avoid being recirculated by endless belt screen 108, are impelled by gravity to eventually land on carrier 105 (which may conveniently be an endless belt or the like) to form fiber mat 106. Carrier 105 is at the bottom of forming chamber 102, which encompasses carrier 105 e.g. being passed through a lower portion of forming chamber 102, or being passed underneath an opening in the bottom of forming chamber 102, so that in either case fibers 3 can be deposited thereon. Carrier 105 may be airpermeable; and, an at least partial vacuum may be applied to the bottom surface of carrier 105, so that a pressure differential can be applied through carrier 105 to assist in the depositing and retaining of fibers and particulate additives on carrier 105. It may be convenient to use a disposable airpermeable layer (e.g., a thin disposable porous paper liner, such as tissue paper) atop carrier 105 if desired. Fiber mat 106 comprising at least deposited fibers 3 can be carried out of, or away from, forming chamber 102, upon carrier 105. If desired, roll 123 may be provided at the point at which fiber mat 106 exits forming chamber 102.

Fibers 3 as collected as fiber mat 106 from first forming chamber 202, may then be introduced (e.g., by way of fiber input device 31), into second forming chamber 2 to be processed in similar manner as described above for forming chamber 102. Forming chamber 2 is generally similar to forming chamber 102, with the above descriptions of components of forming chamber 102 applying to their counterparts of forming chamber 2. Forming chamber 2 may be in tandem with forming chamber 102 (e.g., as in the exemplary design of FIG. 1); or forming chamber 2 may be separate, with fiber mat 106 being temporarily stored and/or transported before being taken to forming chamber 2. In such cases, it may be advantageous that fiber mat 106 is not baled or compressed in such storage or transportation.

In some embodiments, additional fibers (whether inorganic or organic) may be introduced into second forming chamber 2, in which case the forming chamber 2 will serve to blend the different type fibers together with each other as well as to perform the mechanical separation of fibers described earlier. Such additional fibers may be introduced by fiber input device 31; or, a separate fiber input device may be used. In some embodiments, one or more types of inorganic particulate additive 21 may be introduced into forming chamber 2, in which case forming chamber 2 will serve to blend particulate additive 21 with the inorganic fibers. Particulate additive 21 may comprise one or more intumescent additives, one or more endothermic additives, one or more insulative additives, and one or more binders, or the like, as described in detail later herein. If present, particulate additive 21 may be introduced into forming chamber 2 by fiber input device 31 along with fibers 3, or may be introduced separately, e.g. by way of particle input device 22. Fiber input device 31 may be advantageously positioned in an upper portion of forming chamber 2 (as shown in FIG. 1), e.g. so that fibers 3 may be easily brought in proximity to fiber-separating rollers 7 to be processed as described above. Particle input device 22 may be located in an upper portion of forming chamber 2, e.g. if it is desired to have particulate additives 21 be brought into proximity to rollers 7.

Or, particle input device 22 may be located in a lower portion of forming chamber 2 (e.g., below rollers 7). Any arrangement is possible, as long as sufficient blending of particulate additives 21 with the fibers is achieved for a particular application.

Forming chamber 2 may also comprise a fluid (liquid) spray system 32, which may spray a fluid onto fibers 3 before they are introduced into forming chamber 2, may spray a fluid into the interior of forming chamber 2 so as to contact the fibers therein, and/or may spray a fluid onto fibers 3 after they are deposited as a mat and have exited forming chamber 2. The fluid may be used for any purpose. For example, the fluid may comprise water, an aqueous solution, or a nonaqueous fluid or solution, that serves to enhance the processing of the fibers. Or, the fluid may comprise a solution, dispersion, latex, etc., e.g. comprising one or more binders, and/or comprising one or more inorganic particulate additives, as described in detail later herein. If desired, the fluid may comprise inorganic particulate additive 21.

Within forming chamber 2, inorganic fibers 3 (and any other fibers and/or particulate additives blended therewith) are processed in generally similar manner to that described above for forming chamber 102, with the use of rollers 7 (e.g., in rows 71-74), protrusions 4, belt 8, and so on. Within forming chamber 2, the inorganic fibers (and particulate additives, if present) that avoid being recirculated by endless belt screen 8, are impelled by gravity to eventually land on carrier 5 to form fiber mat 6. Typically, fibers 3 land in a configuration that may be generally parallel to the surface of carrier 5, and that may be generally random with respect to the downweb and crossweb axes of carrier 5. Carrier 5 is at the bottom of forming chamber 2, and may be air-permeable, all in similar manner as described with respect to carrier 105. It may be convenient to use a disposable air-permeable layer (e.g., a thin disposable porous paper liner) atop carrier 5 if desired. The gravity-laying process can advantageously deposit fibers (and particulate additives, if present), generally uniformly across the crossweb thickness of the formed fiber mat 6.

Figure 2:
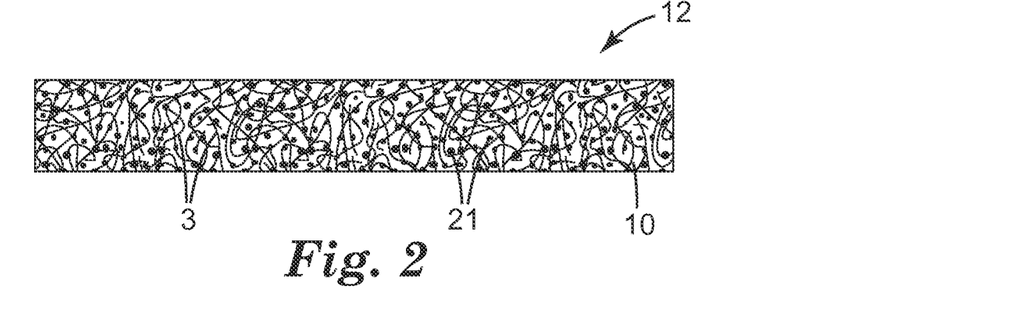
FIG. 2 shows a side view of an exemplary article comprising a gravity-laid inorganic fiber web.

Fiber mat 6 can be carried out of, or away from, forming chamber 2, upon carrier 5. If desired, roll 23 may be provided at the point at which fiber mat 6 exits forming chamber 2. Roll 23 may cause fiber mat 6 to momentarily compress, although typically fiber mat 6 may rebound substantially. All references herein to an as-deposited thickness of fiber mat 6 refer to the thickness of fiber mat 6 after having passed under roll 23. Fiber mat 6 may then consolidated, e.g. by consolidation unit 9, to form inorganic fiber web 10. Inorganic fiber web 10 can be further processed, e.g. by post-processing unit 11, to separate web 10 into discrete articles 12. Articles 12 (as shown in an exemplary embodiment in FIG. 2) may comprise any suitable shape, size or configuration as desired for a given use. In particular, articles 12 may be useful in fire-protective applications.

The use of first and second forming chambers 102 and 2 as described herein can provide several advantages. First forming chamber 102 can serve to open inorganic fibers 3, e.g. from an initially relatively compressed state that they might be received in. For example, inorganic fibers are often packaged in compressed bales, for convenience of shipping. While it is possible to obtain bale openers that are designed to open the fibers from this compressed condition, such conventional openers often cause unacceptable breakage of inorganic fibers (particularly, ceramic fibers), due to the relative brittleness of such fibers. In contrast, forming chamber 102 may serve to open (e.g., to decompress, fluff, etc.) inorganic fibers 3 into a relatively uncompressed state, with minimum breakage. The use of a first pass of inorganic fibers 3 through a forming chamber to open inorganic fibers may result in an enhanced separation of individual fibers 3 from each other, an improved (e.g., more homogeneous) inorganic fiber mat 6 (and inorganic fiber web 10 produced therefrom) being produced by second forming chamber 2, and the like. The use of a first pass of inorganic fibers through a forming chamber to open the fibers, followed by a second pass through a forming chamber in which the opened fibers are blended with other fibers and/or particulate additives, may be particularly useful when the inorganic fibers are relatively long fibers such as long basalt fibers, long glass fibers, long ceramic fibers, and the like. However, any fiber, including short basalt fibers, mineral wool and the like, can be opened by a first pass through a forming chamber, if desired. The use of a first, opening pass through a forming chamber, may be particularly useful if the deposited inorganic fiber mat is to be at least partially consolidated by needle-punching.

In some embodiments, first forming chamber 102 may be used primarily to open fibers 3, with second forming chamber 2 being used to blend fibers 3 with other fibers and/or with particulate additives 21 and to collect the blended mixture as a mat. Accordingly, it may not be necessary to provide first forming chamber 102 with a particle input device, spray device, and so on, as are provided on second forming chamber 2 in the exemplary design of FIG. 1. However, such capability may be provided in first forming chamber 102, and/or first forming chamber 102 may be used for blending of additional fibers and/or particulate additives, if desired.

In some embodiments, first forming chamber 102, and potentially second forming chamber 2, may be used to reduce the amount of shot in the fibers 3, if shot is present. Those of ordinary skill in the art are familiar with shot as particles, e.g. solid particles, which are sometimes formed e.g. in melt-processing of fibers, and which can have disadvantageous effects. By the shearing action of the fiber-separating rollers, shot can be removed from the fiber population and can then be separated from the fibers, for example by sieves, if provided in forming chambers 102 or 2. Alternatively, shot may be separated from the fibers by centrifugal forces e.g. using a cyclonic separation device. Although only two forming chambers are shown in the exemplary design of FIG. 1, three or more forming chambers may be used if it is desired to further enhance the opening of certain fibers. And, as mentioned, in some embodiments the opening may be performed by two or more sequential passes through a single forming chamber, rather than by using separate chambers.

Figure 3:
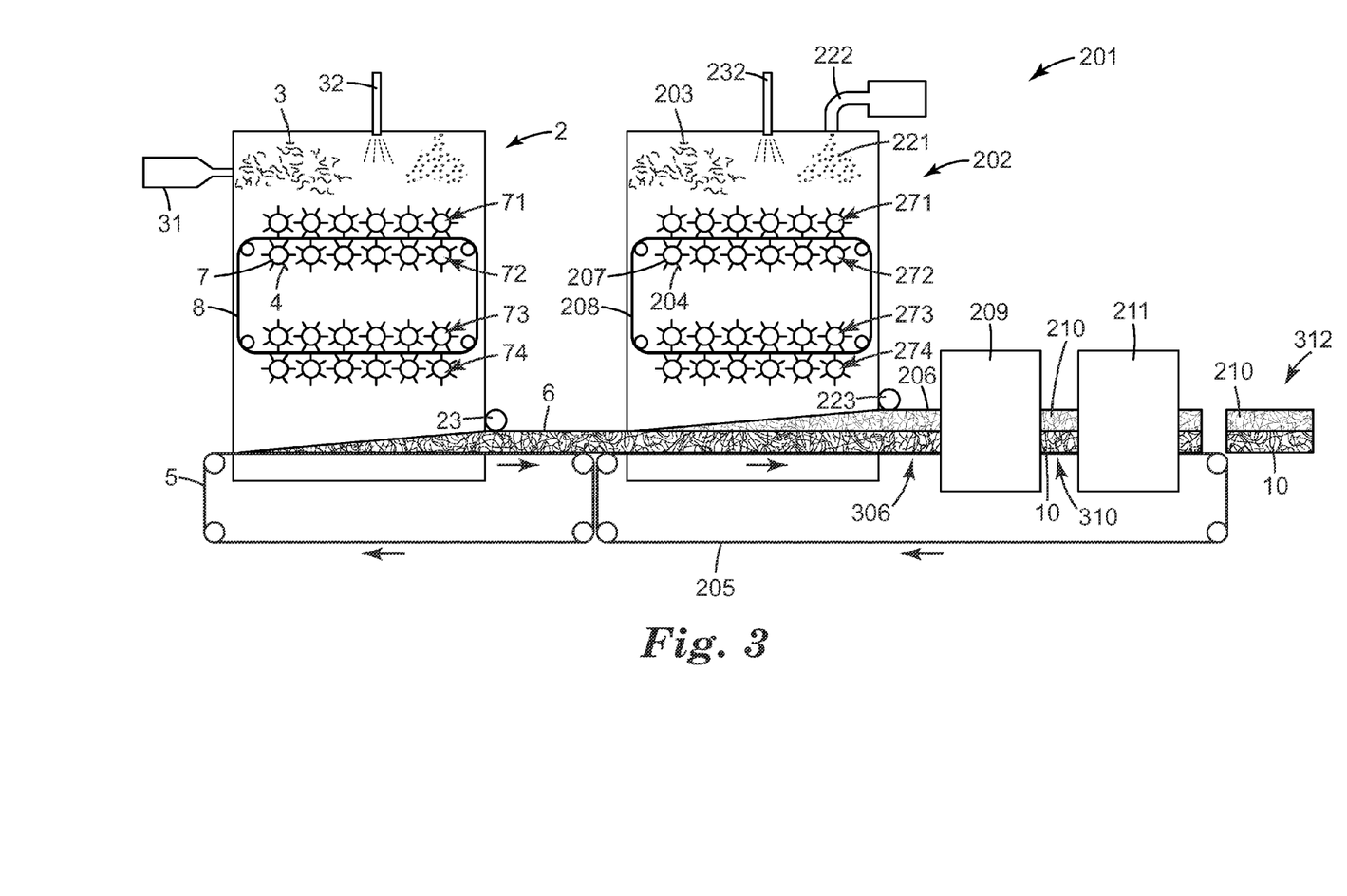
FIG. 3 shows a schematic side view of an exemplary process that can use two forming chambers to make a multilayer gravity-laid inorganic fiber web.

FIG. 3 is a side view showing, in another embodiment, an exemplary apparatus 201 and process that can use two forming chambers 2 and 202 (both shown in cutaway) in tandem to make a multilayer gravity-laid inorganic fiber web 310. Inorganic fibers 3, and optionally additional fibers and/or particulate additives, are introduced into forming chamber 2, which is configured as described above with respect to FIG. 1. Inorganic fibers 3, and any other fibers or particulate additives that are blended therewith in forming chamber 2, are deposited onto carrier 5 as fiber mat 6, in similar manner as described above. Fiber mat 6 is then carried (which may occur by transfer of fiber mat 6 from carrier 5 onto separate carrier 205, as shown in FIG. 3) directly to forming chamber 202 that is in tandem with forming chamber 2. Forming chamber 202 may be substantially similar to forming chamber 2, and components 203-205, 222-223, 232, and 271-274, and operation thereof should be understood to function in similar manner to their counterparts in forming chamber 2. In this mode of operation, fiber mat 6 is carried into the bottom of forming chamber 202 (e.g., atop carrier 205), such that fibers (e.g., inorganic fibers) 203, and optionally particulate additives 221, are deposited atop fiber mat 6 (hereafter referred to as fiber mat layer 6) to form fiber mat 206 (hereafter referred to as fiber mat layer 206). In this manner can be formed multilayer fiber mat 306, comprised of gravity-laid fiber mat layer 6 and gravity-laid fiber mat layer 206.

Multilayer fiber mat 306 may then be consolidated, e.g. by consolidation unit 209 as described later herein, to form multilayer gravity-laid inorganic fiber web 310, which comprises gravity-laid inorganic fiber web layers 10 and 210, e.g. in coterminous relationship and adhered to each other. Multilayer inorganic fiber web 310 can be further processed, e.g. by post-processing unit 211, to separate multilayer web 310 into discrete multilayer articles 312. Articles 312 (as shown in an exemplary embodiment in FIG. 4) may comprise any suitable shape, size or configuration as desired for a given use. Fiber mat layer 6 and fiber mat layer 206 of multilayer fiber mat 306 (and the corresponding webs formed by the consolidation thereof) can differ as desired in composition, thickness, and/or other properties. Either layer can have any combination of any of the components and compositions described herein. It will be understood that any description of a mat and/or a web (or of fibers, particles, etc. therein) contained herein will be applicable to mat 6 or web 10, and also to mat layers 206 or 306, and web layers 10 and 210, respectively. Certain compositions may be particularly advantageous, e.g., in particular fire-protective applications, as discussed later herein. Further details of compositions that may be used, in one or more layers of a multilayer inorganic fiber web, may be found in U.S. Provisional Patent Application Ser. No. 61/323,425, titled INORGANIC FIBER WEBS AND METHODS OF MAKING AND USING, filed Apr. 13, 2010, which is herein incorporated by reference. Any of the compositions described therein may be used in a layer of a multilayer inorganic fiber web, in combination with any other of the compositions described therein in another layer of the multilayer inorganic fiber web.

The above-described process of fiber agglomerates being mechanically separated (e.g., de-agglomerated) by fiber-separating rollers (rotating at relatively low speeds and hence imparting relatively low shear) within a forming chamber, with the mechanically separated fibers falling through the forming chamber to land on a carrier and with any remaining fiber agglomerates (if present) being recirculated by an endless belt screen, is termed herein as gravity-laying, with an inorganic fiber mat formed therefrom termed a gravity-laid inorganic fiber mat. The gravity-laying process can be distinguished from so-called wet laid web formation processes which rely on papermaking apparatus and methods. This process can also be distinguished from well-known conventional dry-laying web formation processes such as carding, garnetting and air-laying. Carding or garnetting involves mechanical separation of fiber clumps (e.g., by carding rolls generally rotating at relatively high speeds) and alignment of the fibers into a generally parallel, downweb-oriented configuration. This type of (relatively high shear) mechanical separation is well known to impart substantial breakage if used with inorganic fibers, in particular with ceramic fibers and/or inorganic fibers that are relatively long. Air-laying processes (such as those using commercially available web forming machines such as those marketed under the trade designation "RANDO WEBBER" by Rando Machine Corp. of Macedon, N.Y.) typically involve the use of a lickerin roll (generally rotating at relatively high speed) and a high velocity air stream to convey fibers onto a collecting surface. In like manner to mechanical carding, air-laying is known to cause significant breakage to inorganic fibers, particularly to relatively long and/or ceramic inorganic fibers. In contrast, the gravity-laying process relies on fiber-separating rollers which (e.g., by rotating at much lower speeds than the speed of rotating lickerin rolls, rotating carding rolls and the like) can process inorganic fibers, particularly long fibers and/or ceramic fibers, with minimal breakage.

As deposited on a carrier by use of forming chambers as described above, inorganic fibers will comprise an inorganic fiber mat which may have little or no mechanical strength or integrity. Such a mat can then be consolidated, e.g. by a consolidation unit, so as to have sufficient mechanical integrity to comprise an inorganic fiber web. By inorganic fiber web is meant an inorganic fiber mat that has been consolidated (e.g., by way of some or all of the fibers of the web being entangled with each other and/or being bonded to each other, either directly or indirectly) so that the web is a self-supporting web, e.g. with sufficient mechanical strength (downweb, crossweb, and through the thickness of the web), to be handled in operations such as rolling, cutting, converting, and the like, so as to enable the inorganic fiber web to be formed into various products as disclosed herein. With regard to the embodiment of FIG. 1, fiber mat 6 may be consolidated to form fiber web 10. Fiber mat can remain on carrier 5 during consolidation e.g. by means of consolidation unit 9, or, fiber mat 6 can be transferred to a separate carrier for consolidation.

With regard to embodiments of the type exemplified by FIG. 3, the consolidation process will result in the transformation of fiber mat layer 6 and fiber mat layer 206 into fiber web layer 10 and fiber web layer 210, respectively. It will also result in fiber web layer 10 and fiber web layer 210 being satisfactorily adhered to each other, unless it is desired that layers 10 and 210 are separable in use by an end user. Any of the later-described consolidation methods can be used, separately or in combination, to perform these functions. Descriptions herein of such uses as applying to consolidation of a fiber mat will be understood as also applying to a fiber mat layer. Using such methods, in some embodiments two (or more) mat layers can undergo consolidation at the same time and by the same method. In other embodiments, individual fiber mat layers may be consolidated at different times and/or by different methods (e.g., one layer might be needle-punched, with the other being consolidated by activation of a binder). In some embodiments, fiber mat layer 6 may be at least partially consolidated before being introduced into forming chamber 202.

In some embodiments a fiber mat may be consolidated by needle-punching (also known as needle tacking) In such cases, consolidation unit 9 or 209 may comprise a needle-punching unit. A needle-punched mat refers to a mat wherein there is physical entanglement of fibers provided by multiple full or partial penetration of the mat, for example, by barbed needles. With particular regard to the embodiment of FIG. 3, needle-punching of two (or more) mat layers may result in fibers from the different layers being entangled with each other, which may at least partially secure the layers to each other. The fiber mat can be needle-punched using a conventional needle-punching apparatus (e.g., a needle-puncher commercially available under the trade designation "DILO" from Dilo, Germany, with barbed needles (commercially available, for example, from Foster Needle Company, Inc., Manitowoc, WI) to provide a needle-punched fiber mat. The number of needle-punches per area of mat may vary depending on the particular application, and in particular in view of the reduction in thickness of the web that it is desired to impart in performing the needle-punching process. In various embodiments, the fiber mat may be needle-punched to provide about 2 to about 2000 needle-punches/cm$^2$. Those of ordinary skill in the art will appreciate that any suitable needle, including those known to be particularly suitable for the processing of inorganic fibers, may be used. Suitable needles may include for example those available from Foster Needle, Manitowoc, WI, under the trade designations 15×18× 32×3.5RB F20 9-6NK/CC, 15×18×32×3.5CB F20 9-6.5NK/CC, 15×18×25×3.5RB F20 9-7NK, and 15×18×25×3.5RB F20 9-8NK, or the equivalents thereof. Even if the needles do not penetrate all the way into the fiber mat or into all layers of a multilayer mat, the needle-punching process may at least provide sufficient fiber entanglement in a layer proximal to the surface of the mat, to enhance the tensile strength of the fiber web in the downweb and crossweb directions. In some embodiments of this type, the needle-punching may result in the formation of a substantially densified surface layer comprising extensively entangled fibers. Such a densified surface layer may e.g. have a density of fibers per unit volume of the densified layer that is at least 20, at least 30, or at least 40% higher than the fiber density of an interior portion of the web that was not needle-punched. In various embodiments, the mat (or, collectively, the mat layers), can be needle-punched from one side, or from both sides.

In some embodiments a fiber mat may be consolidated by stitchbonding using techniques e.g. as taught in U.S. Pat. No. 4,181,514. For example, the mat may be stitchbonded with an organic thread or an inorganic thread, such as glass, ceramic or metal (e.g., stainless steel).

In some embodiments, a fiber mat may be consolidated by a bonding process in which the mat contains a binder which is activated to bond at least some of the fibers together. Such a binder may be introduced in solid form (e.g., in the form of a powder, as fibers, etc.), in liquid form (such as a solution, dispersion, suspension, latex, or the like), and so on. Whether in solid or liquid form, one or more binders may be introduced into forming chamber 2 by being deposited onto, or mixed with, fibers 3 before fibers 3 are introduced into forming chamber 2; or, may be introduced into forming chamber 2 so as to contact fibers 3 therein; or, may be deposited onto/into fiber mat 6 after formation of fiber mat 6, as desired. In embodiments of the type exemplified by FIG. 3, one or more binders may similarly be introduced into forming chamber 202. In such embodiments, the type and/or amount of binder in fiber mat layer 206 may be the same or different as that in fiber mat layer 6. The binder(s) may be distributed throughout the interior of a fiber mat or fiber mat layer, or may be present primarily at one or more major surfaces thereof (e.g., if the binder is deposited on a major surface of a fiber mat in such a way as to not penetrate substantially into the fiber mat). In such cases the binder(s) may provide a surface layer of bonded fibers that enhances the downweb and/or crossweb tensile strength of the web. The binder(s) may be organic or inorganic. In the event that one or more inorganic particulate additives (e.g., one or more intumescent additives, one or more endothermic additives, one or more insulative additives, or mixtures thereof) are to be included in the web or web layer, the binder(s) may serve to bind the inorganic particulate additive(s) in the web. In some embodiments, consolidation can be achieved by a combination of needle-punching and activation of one or more binder(s). In such embodiments, the needle-punching can be performed before the activation of the binder, or after.

As organic binders, various rubbers, water-soluble polymer compounds, thermoplastic resins, thermosetting resins or the like may be suitable. Examples of rubbers include natural rubbers; acrylic rubbers such as copolymers of ethyl acrylate and chloroethyl-vinyl ether, copolymers of n-butyl acrylate and acrylonitrile or the like; nitrile rubbers such as copolymers of butadiene and acrylonitrile or the like; butadiene rubbers or the like. Examples of water-soluble polymer compounds include carboxymethyl cellulose, polyvinyl alcohol or the like. Examples of thermoplastic resins include acrylic resins in the form of homopolymers or copolymers of acrylic acid, acrylic acid esters, acrylamide, acrylonitrile, methacrylic acid, methacrylic acid esters or the like; an acrylonitrile-styrene copolymer; an acrylonitrile-butadiene-styrene copolymer or the like. Examples of thermosetting resins include bisphenol-type epoxy resins, novolac-type epoxy resins or the like. Such organic binders may be used in the form of a binder liquid (e.g., an aqueous solution, a water-dispersed emulsion, a latex or a solution using an organic solvent).

Bonding may also be accomplished by including an organic polymeric binder material in the form of a powder or fiber into the mat or mat layer, and heat treating the mat so as to cause melting or softening of the polymeric material thereby bonding at least some of the fibers of the mat to each other. In such cases, consolidation unit 9 or 209 may comprise an oven or any other suitable heating unit. In embodiments of the type exemplified by FIG. 3, such binder(s) may also provide that fiber web layer 10 and fiber web layer 210 are bonded to each other, e.g., by way of, at the interface between layers 6 and 206, at least some fibers 3 of fiber mat layer 6, and at least some fibers 203 of fiber mat layer 206, becoming bonded to each other by the binder. Suitable polymeric binder materials that may be included in the mat include thermoplastic polymers including polyolefins, polyamides, polyesters, vinyl acetate ethylene copolymers and vinylester ethylene copolymers. Alternatively, thermoplastic polymeric fibers may be included in the mat. Examples of suitable thermoplastic polymeric fibers include polyolefin fibers such as polyethylene, or polypropylene, polystyrene fibers, polyether fibers, polyester fibers such as polyethylene terephthalate (PET) or polybutylene terephthalate (PBT), vinyl polymer fibers such as polyvinyl chloride and polyvinylidene fluoride, polyamides such as polycaprolactam, polyurethanes, nylon fibers and polyaramid fibers. Particularly useful fibers for thermal bonding of the fiber mat include also the so-called bicomponent bonding fibers which typically comprise polymers of different composition or with different physical properties. Often, such fibers are core/sheath fibers where e.g. the polymeric component of the core has a higher melting point and provides mechanical strength and the sheath has a lower melting point to enable bonding, e.g. melt-bonding, to occur. For example, in one embodiment, the bicomponent bonding fiber may be a core/sheath polyester/polyolefin fiber. Bicomponent fibers that can be used include those commercially available under the trade designation "TREVIRA 255" from Trevira GmbH, Bobingen, Germany, and under the trade designation "FIBER VISION CREATE WL" from FiberVisions, Varde, Denmark.

Such organic binders, if present, may be used in any suitable amount. In various embodiments, the amount of organic binder may be less than about 20%, 10%, 5%, 2%, 1%, or 0.5% by weight, based on the total weight of inorganic fiber web 10. In some embodiments, the amount of organic binder may be at least 0.2%, 0.5%, or 1.0%. In some embodiments, the inorganic fiber web contains substantially no organic binder. Those of ordinary skill will appreciate that as used here and in other contexts herein, the term "substantially no" does not preclude the presence of some extremely low, e.g. 0.1% by weight or less, amount of material, as may occur e.g. when using large scale production equipment subject to customary cleaning procedures. Such organic binders may be used singly, in combination with each other, and/or in combination with one or more inorganic binders, as desired. Such organic binders may be used in combination with any suitable inorganic fibers, including e.g. ceramic fibers, biosoluble fibers, basalt fibers, mineral wool fibers, and any combinations thereof. Such organic binders may also be used in combination with any suitable inorganic particulate additive, including e.g. intumescent, endothermic, and/or insulative additives, and mixtures thereof.

Inorganic binders may be used if desired (e.g., instead of, or in combination with, the above-mentioned organic binders), and may provide advantageous high temperature performance e.g. in certain fire-protective applications. Suitable inorganic binders may include, for example, alkali metal silicates, phosphates, borates, clays, and the like. Thus, suitable inorganic binders may include e.g. sodium silicate, potassium silicate, lithium silicate, silicophosphate, aluminum phosphate, phosphoric acid, phosphate glass (e.g., water-soluble phosphate glass), borax, silica sol, bentonite, hectorite, and the like. Such binders may be used singly, in combination with each other, and/or in combination with one or more organic binders, as desired. Such inorganic binders may be used in combination with any suitable inorganic fibers, including e.g. ceramic fibers, biosoluble fibers, basalt fibers, mineral wool fibers, and any combinations thereof. Such inorganic binders may also be used in combination with any suitable inorganic particulate additive, including e.g. intumescent additives, endothermic additives, and/or insulative additives.

Such inorganic binders, if present, may be used in any suitable amount. In various embodiments, the amount of inorganic binder may be at least 0.1%, 0.5%, or 1.0% by weight, based on the total weight of inorganic fiber web 10. In further embodiments, the amount of inorganic binder may be at most 20%, 10%, or 5%. Binders as disclosed above, whether organic or inorganic, typically will be activated in order to bond at least some of fibers 3 to each other to consolidate inorganic fiber mat 6 into inorganic fiber web 10, and/or to bind one or more inorganic particulate additives into inorganic fiber web 10. Such activation processes may comprise heat exposure (e.g., in the case of bicomponent organic polymeric bonding fibers). Or such activation processes may comprise removal of liquid, e.g., solvent (e.g., removal of water in the case of inorganic binders such as sodium silicate and the like). Such activation by removal of solvent may be assisted by heat exposure, if desired. Any combination of such processes falls under the term activation, as used herein.

As mentioned, if a heat-activated binder is used, inorganic fiber mat 6 may be consolidated into inorganic fiber web 10 by being passed through an activation unit 9 (e.g., an oven, or any other suitable heat source, including e.g. IR lights and the like). If desired a roll may be provided at the point at which fiber web 10 exits activation unit 9. Such a roll may cause fiber web 10 to at least momentarily compress. In certain cases, e.g. in which a binder has not yet completely cooled and solidified by the time the web is passed under the roll, fiber web 10 may not rebound completely to its pre-oven thickness. In this manner the final thickness of fiber web 10 can be altered or set. In some cases, e.g. in which a very thick web is desired, such a roll may be removed. In embodiments of the type exemplified by FIG. 3, similar considerations apply to the consolidation of multilayer inorganic fiber mat 306.

The above-described process of gravity-laying, followed by consolidation, can be used to produce a gravity-laid inorganic fiber web. In embodiments of the type illustrated in FIG. 3, two or more gravity-laid inorganic fiber webs may be present as part of a multilayer web. All descriptions herein of the use of inorganic fibers, binders, particulate additives, etc., should be understood as applying to the inclusion of such materials in a gravity-laid web whether the web is a single layer or is one layer of a multilayer construction. As defined herein, the term gravity-laid inorganic fiber web means a nonwoven web in which at least about 80 weight % of the fibers of the web are inorganic fibers and that was made by the consolidation of an inorganic fiber mat made by the above-described process of separating fibers (e.g., from an initially at least partially clumped or agglomerated state) by the mechanical action of fiber-separating rollers, with the mechanically separated fibers allowed to gravity-drop onto a collecting surface to form a mat, with any remaining clumps or agglomerates of fibers (if present) being recycled to undergo the mechanical separation process again. In various embodiments, at least about 90 weight %, or at least about 95 weight %, of the fibers of the web are inorganic fibers.

Those of ordinary skill in the art will recognize that a gravity-laid inorganic fiber web as defined and described herein can be distinguished from a conventional wet-laid web by way of any or all of several measurable properties of the web. For example, those of ordinary skill in the art will appreciate that wet-laid webs as conventionally made will comprise structural features indicative of a wet-laid process, and/or will comprise various adjuvants (which may include e.g. binders, processing aids, flocculants, antifoamers, and so on) which, even if present in the final dried web only in microscopic quantities, can be identified as indicative of a wet-laid process.

Those of ordinary skill in the art will further recognize that a gravity-laid inorganic fiber web as disclosed and described herein can be distinguished from a conventional carded web, e.g., by virtue of the fact that the webs described herein may comprise fibers oriented in a generally random fiber orientation (with respect to the length and width of the web), in contrast to conventional carded webs which typically exhibit a configuration in which the fibers of the web are oriented generally parallel to each other along the downweb axis of the web. In some cases, a gravity-laid inorganic web as disclosed herein may be distinguished from a carded web by virtue of the gravity-laid web comprising inorganic fibers having a length that is similar to (i.e., at least 80% of, or even 90% of, on average) the length of the inorganic fibers that were used to make the web. In contrast, as discussed above, conventional carding processes typically produce webs in which the length of the inorganic fibers is significantly reduced from (i.e., less than 80% of) their length prior to being carded. Such distinctions may be particularly evident in the use of long inorganic fibers (with long being defined herein as meaning at least about five cm in length), and/or in the use of ceramic fibers, which are known to those of ordinary skill to be quite brittle and fragile. A gravity-laid web is similarly distinguishable from conventional air-laid webs (e.g., made by a Rando-Webber type apparatus) in similar manner, for similar reasons.

Those of ordinary skill in the art will still further recognize that a gravity-laid inorganic fiber web as defined and described herein can be distinguished from inorganic fiber webs made by generation and direct collection of inorganic fibers (e.g., made by supplying mineral melt to a rotating rotor and directly collecting solidified fibers made thereby). A gravity-laid inorganic fiber web may be distinguished from such direct-collected webs e.g. by virtue of the gravity-laid web comprising little or no shot in comparison to conventional direct-collected inorganic fiber webs, comprising few or no fiber clumps or agglomerates in comparison to conventional direct-collected inorganic fiber webs, comprising fibers of discrete length (e.g., chopped fibers), comprising fibers of two or more distinct populations (e.g., differing in size, length, composition, etc.), and/or comprising particulate additive(s) and/or binder(s) of a composition and/or amount incompatible with direct-collection methods. In particular, a gravity-laid inorganic fiber web may be distinguished from such direct-collected webs by virtue of the high cross-web thickness uniformity that may be exhibited by the gravity-laid web (for example, the thickness may vary less than 10% from the crossweb edges of the web to the center of the web). Those of ordinary skill will appreciate that direct-collected webs are typically noticeably thinner toward their crossweb edges than along their centerline, owing to the nature of the melt-formation/direct-collection process.

A gravity-laid inorganic fiber web as disclosed in embodiments of the type illustrated in FIG. 1 is a monolithic web, meaning that it is made of one continuous layer (e.g., of a generally uniform composition). In embodiments of the type illustrated in FIG. 3, the individual gravity-laid fiber web layers 10 and 210 of multilayer web 310 are monolithic. (Other layers may be added to either web as desired). In some embodiments, a gravity-laid inorganic fiber web or multilayer gravity-laid inorganic fiber web may comprise a thickness in the range from about 0.5 cm to about 20 cm. As defined herein, the thickness of an inorganic fiber web means the distance between the first and second major outer surfaces of the web, along the shortest dimension of the web, and may be conveniently obtained by placing the web on a flat hard surface and placing a 0.6 meter×0.6 meter, 2.0 kg flat panel (e.g., a flat metal panel) atop a 0.6 meter×0.6 meter portion of the web (for a loading of approximately 0.54 grams/cm$^2$). Such a weighted panel can compensate for any thickness variations (e.g., when samples are made on pilot scale equipment) and can provide an "overall" thickness of a web. (In certain circumstances, e.g. in the evaluation of crossweb variations in thickness of a web, it may be preferred to measure the thickness of various web portions, in the absence of such a weight). All references herein to the as-deposited thickness of a fiber mat, and all references to the final thickness of a fiber web, refer to the thickness measured with a 2 kg panel, unless specifically noted otherwise.

In some embodiments, the thickness of the gravity-laid inorganic fiber web or the multilayer gravity-laid inorganic fiber web is at least about 5 cm. In some embodiments, the web may comprise a bulk density of about 0.1 grams per cm$^3$ or less. In other embodiments, the web may comprise a bulk density of greater than 0.1, to 0.3, grams per cm$^3$. In still other embodiments, the web may comprise a bulk density of greater than 0.3, to 1.0 grams per cm$^3$. In particular embodiments, the web may comprise a bulk density of greater than 1.0 grams per cm$^3$. In some embodiments, a gravity-laid inorganic fiber web or a multilayer gravity-laid inorganic fiber web as disclosed herein may comprise a weight per unit area in the range from about 500 g/m$^2$ to about 20000 g/m$^2$.

Figure 4:
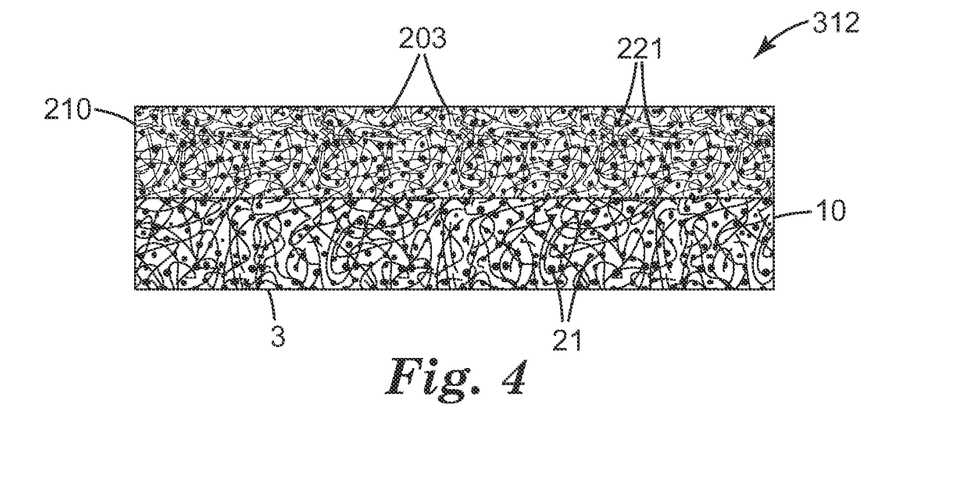
FIG. 4 shows a side view of an exemplary article comprising multiple gravity-laid inorganic fiber webs as part of a multilayer article.

Gravity-laid inorganic fiber web 10 or multilayer gravity-laid inorganic fiber web 310 can be further processed, e.g. by post-processing unit 11 or 211 respectively, to separate web 10 into discrete articles 12 (as shown in an exemplary embodiment in FIG. 2) or 312 (as shown in an exemplary embodiment in FIG. 4). Such articles may comprise any suitable shape, size or configuration as desired for a given use. In particular, such articles may be useful in fire-protective applications, as discussed later herein in detail.

As mentioned above, at least about 80% by weight of the fibers of a gravity-laid web are inorganic fibers (e.g., that contain less than 2 weight % carbon). In some embodiments, substantially all of the fibers of the web are inorganic fibers. Those of ordinary skill will appreciate that as used here and in other contexts herein, the term "substantially all" does not preclude the presence of some extremely low, e.g. 0.1 weight % or less, amount of other fibers, as may occur e.g. when using large scale production equipment subject to customary cleaning procedures. In the gravity-laid inorganic fiber webs disclosed herein, inorganic fibers are mechanically separated (e.g. from clumps, if present) into individual fibers, or at least into agglomerates of only a few fibers, as described above. Thus, by definition, gravity-laid inorganic fiber webs do not encompass webs in which inorganic fibers are present in the web only in the form of granulates, generally unseparated clumps of large numbers of fibers, and the like. Also by definition, gravity-laid inorganic fiber webs contain substantially no organic filler, organic filler being defined herein as meaning shredded fabric textile materials, rubber residue or any other material from rubber tires, and the like. (This proviso does not preclude the presence of any the aforementioned organic binders, whether in the form of fibers, powders, latex, etc.).

Inorganic fibers used in the methods and articles disclosed herein may include any such fibers that are capable of meeting the performance criteria required of a particular application. Such inorganic fibers may be chosen e.g. from refractory ceramic fibers, biosoluble ceramic fibers, glass fibers, polycrystalline inorganic fibers, mineral wool (rock wool), basalt fibers and the like. A particular type of inorganic fiber may be used singly; or, at least two or more inorganic fibers of different types may be used in combination.

In some embodiments, the inorganic fibers may comprise ceramic fibers. For example, refractory ceramic fibers may be suitable for certain applications. Suitable refractory ceramic fibers are available from a number of commercial sources and include these known under the trade designations "FIBER-FRAX" from Unifrax, Niagara Falls, N.Y., "CERAFIBER" and "KAOWOOL" from Thermal Ceramics Co., Augusta, Ga.; "CER-WOOL" from Premier Refractories Co., Erwin, Tenn.; and "SNSC" from Shin-Nippon Steel Chemical, Tokyo, Japan.

Some ceramic fibers which may be useful include polycrystalline oxide ceramic fibers such as mullites, alumina, high alumina aluminosilicates, aluminosilicates, zirconia, titania, chromium oxide and the like. Particular fibers of this type include high alumina, crystalline fibers, which comprise aluminum oxide in the range from about 67 to about 98% by weight and silicon oxide in the range from about 33 to about 2% by weight. These fibers are commercially available, for example, under the trade designation "NEXTEL 550" from the 3M Company, "SAFFIL" available from Dyson Group PLC, Sheffield, UK, "MAFTEC" available from Mitsubishi Chemical Corp., Tokyo, Japan) "FIBERMAX" from Unifrax, Niagara Falls, N.Y., and "ALTRA" from Rath GmbH, Germany.

Suitable polycrystalline oxide ceramic fibers further include aluminoborosilicate fibers preferably comprising aluminum oxide in the range from about 55 to about 75% by weight, silicon oxide in the range from less than about 45 to greater than zero (preferably, less than 44 to greater than zero) % by weight, and boron oxide in the range from less than 25 to greater than zero (preferably, about 1 to about 5) % by weight (calculated on a theoretical oxide basis as $Al_2O_3$, $SiO_2$, and $B_2O_3$, respectively). Such fibers preferably are at least 50% by weight crystalline, more preferably, at least 75%, and most preferably, about 100% (i.e., crystalline fibers). Aluminoborosilicate fibers are commercially available, for example, under the trade designations "NEXTEL 312" and "NEXTEL 440" from the 3M Company.

In some embodiments, the inorganic fibers may comprise ceramic fibers that are obtained from a sol-gel process, in which the fibers are formed by spinning or extruding a solution or dispersion or a generally viscous concentrate of the constituting components of the fibers or precursors thereof. In some embodiments, the inorganic fibers used may comprise heat treated ceramic fibers, sometimes called annealed ceramic fibers, e.g. as disclosed in U.S. Pat No. 5,250,269.

A particular type of ceramic fiber may be used singly; or, at least two or more ceramic fibers of different types may be used in combination. In various embodiments, the ceramic fibers may be blended with any other desired inorganic fibers or organic fibers, including biosoluble fibers, glass fibers, basalt fibers, mineral wool fibers, inorganic binders, bicomponent fibers, and so on.

In some embodiments, the inorganic fibers may comprise biosoluble fibers (also known as body-soluble fibers), e.g. biosoluble ceramic fibers. In some embodiments, substantially all of the inorganic fibers of the web are biosoluble ceramic fibers. In further embodiments, substantially all of the fibers of the web are biosoluble ceramic fibers. As used herein, biosoluble fibers refers to fibers that are decomposable in a physiological medium or a simulated physiological medium. Typically, biosoluble fibers are soluble or substantially soluble in a physiological medium within about 1 year. As used herein, the term "substantially soluble" refers to fibers that are at least about 75 weight percent dissolved. Another approach to estimating the biosolubility of fibers is based on the composition of the fibers. For example, Germany proposed a classification based on a carcinogenicity index (KI value). The KI value is calculated by a summation of the weight percentages of alkaline and alkaline-earth oxides and subtraction of two times the weight percent of aluminum oxide in inorganic oxide fibers. Inorganic fibers that are biosoluble typically have a KI value of about 40 or greater.

Biosoluble inorganic fibers suitable for use in the present invention may include inorganic oxides such as, for example, $Na_2O$, $K_2O$, CaO, MgO, $P_2O_5$, $Li_2O$, BaO, or combinations thereof with silica. Other metal oxides or other ceramic constituents can be included in the biosoluble inorganic fibers even though these constituents, by themselves, lack the desired solubility but are present in low enough quantities such that the fibers, as a whole, are still decomposable in a physiological medium. Such metal oxides include, for example, $Al_2O_3$, $TiO_2$, $ZrO_2$, $B_2O_3$, and iron oxides. The biosoluble inorganic fibers can also include metallic components in amounts such that the fibers are decomposable in a physiological medium or simulated physiological medium.

In one embodiment, the biosoluble inorganic fibers include oxides of silica, magnesium, and calcium. These types of biosoluble ceramic fibers may be referred to e.g. as calcium magnesium silicate fibers, or as alkaline earth silicate wools, and so on. The calcium magnesium silicate fibers usually contain less than about 10 weight % aluminum oxide. In some embodiments, the fibers include from about 45 to about 90 weight % $SiO_2$, up to about 45 weight % CaO, up to about 35 weight % MgO, and less than about 10 weight % $Al_2O_3$. For example, the fibers can contain about 55 to about 75 weight % $SiO_2$, about 25 to about 45 weight 30% CaO, about 1 to about 10 weight % MgO, and less than about 5 weight % $Al_2O_3$.

In a further embodiment, the biosoluble inorganic fibers include oxides of silica and magnesia. These types of fibers may be referred to as magnesium silicate fibers. The magnesium silicate fibers usually contain from about 60 to about 90 weight % $SiO_2$, up to about 35 weight % MgO (typically, from about 15 to about 30 weight % MgO), and less than about 5 weight % $Al_2O_3$. For example, the fibers can contain about 70 to about 80 weight % $SiO_2$, about 18 to about 27 weight % MgO, and less than about 4 weight % of other trace elements. Suitable biosoluble inorganic oxide fibers are described e.g. in U.S. Pat. No. 5,332,699 (Olds et al.); U.S. Pat. No. 5,585,312 (Ten Eyck et al.); U.S. Pat. No. 5,714,421 (Olds et al.); and U.S. Pat. No. 5,874,375 (Zoitas et al.). Various methods can be used to form biosoluble inorganic fibers including, but not limited to, sol gel formation, crystal growing processes, and melt forming techniques such as spinning or blowing. Biosoluble fibers are commercially available, for example, from Unifrax Corporation, Niagara Falls, N.Y., under the trade designations "ISOFRAX" and "INSULFRAX," under the trade designations "SUPERMAG 1200" from Nutec Fibratec, Monterrey, Mexico, and Thermal Ceramics, Augusta, Ga., under the trade designation "SUPERWOOL." "SUPERWOOL 607" biosoluble fibers, for example, contain 60 to 70 weight % $SiO_2$, 25 to 35 weight % CaO, 4 to 7 weight % MgO, and a trace amount of $Al_2O_3$. "SUPERWOOL 607 MAX" biosoluble fibers, for example, which can be used at a slightly higher temperature, contain 60 to 70 weight % $SiO_2$, 16 to 22 weight % CaO, 12 to 19 weight % MgO, and a trace amount of $Al_2O_3$.

In various embodiments, if present in the inorganic fiber web, biosoluble ceramic fibers may make up at least about 20 weight %, at least about 50 weight %, at least about 80 weight %, at least about 90 weight %, or at least about 95 weight %, of the inorganic fibers of the web. A particular type of biosoluble fiber may be used singly; or, at least two or more biosoluble fibers of different types may be used in combination. In some embodiments, the biosoluble ceramic fibers may be long fibers (i.e., at least about 5 cm in length). In various embodiments, biosoluble ceramic fibers may be blended with any other desired inorganic fibers or organic fibers, including refractory ceramic fibers, glass fibers, basalt fibers, mineral wool fibers, inorganic binders, bicomponent fibers, and so on. Gravity-laid inorganic fiber web compositions utilizing biosoluble ceramic fibers are discussed in further detail in U.S. Provisional Patent Application Ser. No. 61/323,526, attorney docket number 66308US002, titled INORGANIC FIBER WEBS COMPRISING BIOSOLUBLE CERAMIC FIBERS, AND METHODS OF MAKING AND USING, filed Apr. 13, 2010, which is herein incorporated by reference.

In some embodiments, the inorganic fibers may comprise glass fibers. In particular embodiments, the inorganic fibers may comprise magnesium aluminum silicate glass fibers. Examples of magnesium aluminum silicate glass fibers that can be used include glass fibers having between 10% and 30% by weight of aluminum oxide, between 52 and 70% by weight of silicon oxide and between 1% and 12% of magnesium oxide (based on the theoretical amount of $Al_2O_3$, $SiO_2$, and MgO). It will further be understood that the magnesium aluminum silicate glass fiber may contain additional oxides, for example sodium or potassium oxides, boron oxide and calcium oxide. Particular examples of magnesium aluminum silicate glass fibers include E-glass fibers which typically have a composition of about 55% of $SiO_2$, 15% of $Al_2O_3$, 7% of $B_2O_3$, 19% of CaO, 3% of MgO and 1% of other oxides; S and S-2 glass fibers which typically have a composition of about 65% of $SiO_2$, 25% of $Al_2O_3$ and 10% of MgO and R-glass fibers which typically have a composition of 60% of $SiO_2$, 25% of $Al_2O_3$, 9% of CaO and 6% of MgO. E-glass, S-glass and S-2 glass are available for example from Advanced Glassfiber Yarns LLC and R-glass is available from Saint-Gobain Vetrotex. The glass fibers may be chopped glass fibers, and may be generally free of shot, i.e. having not more than 5% by weight of shot. In some embodiments, heat treated glass fibers may be used. A particular type of glass fiber may be used singly; or, at least two or more glass fibers of different types may be used in combination. In various embodiments, the glass fibers may be blended with any other desired inorganic fibers or organic fibers, including ceramic fibers, biosoluble fibers, basalt fibers, mineral wool fibers, inorganic binders, bicomponent fibers, and so on.

In some embodiments, the inorganic fibers may comprise basalt fibers, typically made by melting and extruding basalt rock to form fibers. Because the fibers are derived from a mineral, the composition of the fibers can vary but generally has a composition, by weight, of about 45 to about 55% $SiO_2$, about 2 to about 6% alkalis, about 0.5 to about 2% $TiO_2$, about 5 to about 14% FeO, about 5 to about 12% MgO, at least about 14% by weight $Al_2O_3$, and often nearly about 10% CaO. The fibers are often shot free, or contain a very low amount of shot (typically less than 1% by weight). In various embodiments, the long basalt fibers may have e.g. an average diameter of from about 1 micron to about 50 microns, from about 2 to about 14 microns, or from about 4 to about 10 microns. Often, basalt fibers have diameters in a range from 5 to 22 microns.

The fibers may be generally continuous as made, and/or can be chopped to desired lengths, with the term long basalt fibers used herein to designate basalt fibers of at least about 5 cm in length. Such long basalt fibers are commercially available, for example, from Sudaglass Fiber Technology, Houston, Tex., and Kamenny Vek, Dubna, Russia. Because of their length, long basalt fibers may advantageously enhance the strength of the inorganic fiber web, while providing higher temperature resistance than e.g. glass fibers, and while being less brittle e.g. than some ceramic fibers. In various embodiments, the long basalt fibers may be blended with any other desired inorganic fibers or organic fibers, including ceramic fibers, biosoluble fibers, glass fibers, mineral wool fibers, inorganic binders, bicomponent fibers, and so on. In various embodiments, if present in the web, long basalt fibers may make up at least about 2 weight %, at least about 5 weight %, or at least about 10 weight %, of the inorganic fibers of the web. In further embodiments, long basalt fibers may make up at most about 90 weight %, at most about 70 weight %, or at most about 50 weight %, of the inorganic fibers of the web. In still further embodiments, substantially all of the inorganic fibers of the web are basalt fibers Gravity-laid inorganic fiber web compositions comprising basalt fibers are discussed in further detail in U.S. Provisional Patent Application Ser. No. 61/323,531, titled INORGANIC FIBER WEBS COMPRISING LONG BASALT FIBERS, AND METHODS OF MAKING AND USING, filed Apr. 13, 2010, which is herein incorporated by reference.

In some embodiments, the inorganic fibers may comprise mineral wool, also known as rock wool or slag wool. Mineral wool is available from a variety of sources, e.g., the Rock Wool Manufacturing Co., Leeds, Ala. Such material may be made e.g. from reprocessed slag, and is typically available at rather short fiber lengths (e.g., one centimeter or less). Because of its generally short fiber length, it may be helpful to blend mineral wool with long inorganic fibers of at least 5 cm in length (e.g., long basalt fibers, long glass fibers, long biosoluble fibers, and/or long ceramic fibers, if available), and/or with organic or inorganic binders. In various embodiments, if present in the web, mineral wool fibers may make up at least about 30 weight %, at least about 50 weight %, or at least about 80 weight %, of the inorganic fibers of the web. In further embodiments, mineral wool fibers may make up at most about 100 weight %, at most about 90 weight %, or at most about 85 weight %, of the inorganic fibers of the web.

Inorganic fibers in any or all of the above-mentioned general categories, and specific types and compositions, may be used singly, or in combination with one or more of the other inorganic fibers mentioned herein, in a gravity-laid inorganic fiber web disclosed herein. Additionally, any or all of the inorganic fibers mentioned herein, singly or in combination, may be used with one or more of the inorganic binders and/or organic binders mentioned herein.

In various embodiments, the inorganic fibers may have e.g. an average diameter of from about 1 micron to about 50 microns, from about 2 to about 14 microns, or from about 4 to about 10 microns. In various embodiments, the inorganic fibers may have an average length of from about 0.01 mm to 100 cm, from about 1 mm to about 30 cm, or from about 0.5 cm to about 10 cm. In particular embodiments, at least some of the inorganic fibers may be long inorganic fibers, meaning at least about 5 cm in length. Such long inorganic fibers may be particularly useful when it is desired to at least partially consolidate the inorganic fiber web by needle-punching. In some embodiments, fibers having a different average length may be combined in a blend. In particular embodiments, a gravity-laid inorganic fiber web may be made with a blend of short (i.e. about 1 cm or less) and long (i.e. about 5 cm or more) inorganic fibers. The short fibers and the long fibers may comprise the same composition; or the short fibers may be comprised of one material (e.g., short ceramic fibers, mineral wool, etc.) and the long fibers may be comprised of another material (e.g., long biosoluble ceramic fibers, long basalt fibers, long glass fibers, etc.)

The gravity-laid inorganic fiber web may contain any suitable inorganic particulate additive(s), which may be introduced into forming chamber 2 and blended (e.g., generally uniformly blended) with inorganic fibers 3 and held within consolidated fiber web 10 (e.g., bonded to inorganic fibers 3), by the methods disclosed earlier herein. In various embodiments, such additives may be introduced into forming chamber 2 in dry form along with fibers 3 (e.g., through fiber input device 31), or may be separately introduced into forming chamber 2 in dry form, (e.g., through particle input device 22). In other embodiments, such additives may be introduced into forming chamber 2 while carried (e.g., as a suspension, solution, dispersion, latex, etc.) by a liquid carrier. Such a liquid carrier may be sprayed onto the fibers before the fibers are introduced into forming chamber 2 (e.g., by way of liquid spray unit 32). Or, such a liquid carrier may be sprayed directly into forming chamber 2. The carrier liquid may be removed from fiber mat 6, e.g. by evaporation, e.g. as assisted by passage through an oven or the like. If particulate additives 21 are introduced into forming chamber 2 in dry form, it may be desired to introduce a liquid (e.g., water) into forming chamber 2 (whether by depositing it onto fibers 3, or by spraying it into forming chamber 2) to enhance the dispersing and contacting of particulate additives 21 with fibers 3.

In various embodiments, the inorganic particulate additive(s) may have an average particle size of at least about 0.1 micron, at least about 0.5 micron, at least about 1.0 micron, or at least about 2.0 micron. In further embodiments, the inorganic particulate additive(s) may have an average particle size of at most about 1000 microns, at most about 500 microns, at most about 200 microns, at most about 100 microns, at most about 100 microns, at most about 50 microns, or at most about 10 microns. In various embodiments, the inorganic particulate additive(s) comprise one or more intumescent additives, one or more endothermic additives, one or more insulative additives, and mixtures thereof.

In some embodiments, the inorganic particulate additive(s) may comprise one or more inorganic intumescent additives. Useful intumescent materials for use in making an intumescent web include, but are not limited to, expandable vermiculite, treated expandable vermiculite, partially dehydrated expandable vermiculite, expandable perlite, expandable graphite, expandable hydrated alkali metal silicate (for example, expandable granular sodium silicate, e.g. of the general type described in U.S. Pat. No. 4,273,879, and available e.g. under the trade designation "EXPANTROL" from 3M Company, St. Paul, Minn.), and mixtures thereof. (In this context, graphite is considered to be inorganic). An example of a particular commercially available intumescent additive is expandable graphite flake, available under the trade designation GRAFGUARD Grade 160-50, from UCAR Carbon Co., Inc., Cleveland, OH. In various embodiments, the intumescent additive(s) may be present at zero, at least about 2%, at least about 5%, at least about 10%, at least about 20%, or at least about 30% by weight, based on the total weight of the inorganic fiber web. In further embodiments, the intumescent additive(s) may be present at most about 80%, at most about 60%, or at most about 50% by weight, based on the total weight of the inorganic fiber web.

In some embodiments, the inorganic particulate additive(s) may comprise one or more inorganic endothermic additives. Suitable endothermic additives may include e.g. any inorganic compound capable of liberating water (e.g., water of hydration) e.g. at temperatures of between 200° C. and 600° C. Suitable endothermic additives may thus include materials such as alumina trihydrate, magnesium hydroxide, and the like. A particular type of endothermic additive may be used singly; or, at least two or more endothermic additives of different types may be used in combination. In various embodiments, the endothermic additive(s) may be present at zero, at least about 2, at least about 5, at least about 10, at least about 20, or at least about 30% by weight, based on the total weight of the inorganic fiber web.

In some embodiments, the inorganic particulate additive(s) may comprise one or more inorganic insulative additives. Suitable insulative additives may include e.g. any inorganic compound that, when present in the inorganic fiber web, can increase the thermal insulating properties of the web, e.g. without unacceptably increasing the weight or density of the web. Inorganic particulate additives that comprise relatively high porosity may be particularly suitable for these purposes. Suitable insulative additives may include materials such as fumed silica, precipitated silica, diatomaceous earth, Fuller's earth, expanded perlite, silicate clays and other clays, silica gel, glass bubbles, ceramic microspheres, talc and the like. (Those of ordinary skill will appreciate that there may not be a clear dividing line between insulative additives and e.g. certain endothermic or intumescent additives). A particular type of insulative additive may be used singly; or, at least two or more insulative additives of different types may be used in combination. In various embodiments, the insulative additive (s) may be present at zero, at least about 5, at least about 10, at least about 20, at least about 40, or at least about 60% by weight, based on the total weight of the inorganic fiber web.

Those of ordinary skill in the art will appreciate that the present methods enable the manufacturing of a wide variety of gravity-laid inorganic fiber webs comprising a variety of fiber compositions and fiber properties (e.g., fiber diameter and/or length), in various combinations with any of the binders, intumescent additives, endothermic additives, and/or insulative additives mentioned herein. Any of the gravity-laid inorganic fiber webs or multilayer gravity-laid inorganic fiber webs as disclosed herein may be used in the formation of fire-protective articles such as fire-protective pillows, blankets, strips, packing materials, and the like. Such fire protective articles are discussed in further detail in U.S. Provisional Patent Application Ser. No. 61/323,425, titled INORGANIC FIBER WEBS AND METHODS OF MAKING AND USING, filed Apr. 13, 2010, which is herein incorporated by reference as mentioned previously.

Those of ordinary skill in the art will appreciate that, in particular, multilayer gravity-laid inorganic fiber webs with different layers of particular compositions and/or properties may be particularly suited for certain fire-protective applications. While not meant to be exhaustive or limiting, some of these will now be discussed. For example, it may be advantageous to provide a multilayer article with a first web layer with higher ability to withstand high temperatures, and that will be placed facing a potential heat source, and a second web layer with lower ability to withstand high temperatures, but that will be separated from the heat source by the first layer, and that can supply added mechanical strength, insulative capacity, etc. Those of skill in the art will further recognize that different inorganic materials vary in their insulative capacity (that is, in their thermal conductivity) as a function of temperature. Thus, it may be useful to provide an first, heat-facing layer (e.g., with a significant portion of biosoluble ceramic fibers) that provides good insulative capacity at high temperatures (e.g., at 538-1093 degrees C.), and a second, cold-side layer (e.g., with a significant portion of glass fibers) that provides good insulative capacity at lower temperatures (e.g., at less than 538° C.). It may be useful to provide one layer (e.g., a heat-facing layer) with one or more intumescent or endothermic additives, and a second layer without such additives. It may be useful to provide one layer with substantially no organic binder, and another layer with an organic binder.

With regard to the embodiment illustrated in FIG. 3, it is contemplated that any number of forming chambers may be used, in tandem, to provide any desired number of gravity-laid inorganic fiber web layers together as a multilayer web. For example, three-layer webs and articles may be envisioned, e.g. with an inner core layer designed primarily to provide mechanical strength (e.g., comprising fibers such as mineral wool, basalt, glass, etc.), that is sandwiched between outer layers designed primarily for high temperature performance (e.g., major outer or surface layers comprising fibers such as biosoluble fibers, comprising one or more intumescent or endothermic additives, and the like). In some embodiments, such articles may comprise major surface layers that have a high amount of bicomponent organic bonding fibers in comparison to a central core region. Such surface functionality may render the major surfaces of the articles relatively sticky at elevated temperatures, and may render the articles useful to serve e.g. as fire-protective pillows with enhanced ability to adhere together and provide mutual reinforcement.

In a fire-protective article in which an inorganic fiber web or fiber web layer contains one or more intumescent additives, in various embodiments the inorganic fiber web or fiber web layer may be capable, upon exposure to sufficiently high temperature, of expanding in thickness at least 50%, 100%, or 200% (although the actual expansion in use may be limited by the space available for such expansion).

List of Exemplary Embodiments

Embodiment 1. A method of making a gravity-laid inorganic fiber web, comprising: introducing inorganic fibers into a first forming chamber that comprises a plurality of first fiber-separating rollers provided in at least one row within the first forming chamber and that comprises a first moving endless belt screen; mechanically separating at least some of the inorganic fibers with the first fiber-separating rollers; capturing any remaining agglomerates of the inorganic fibers by the first moving endless belt screen and returning the captured agglomerates to the first fiber-separating rollers to be mechanically separated by the first fiber-separating rollers; collecting the mechanically separated inorganic fibers; introducing at least some of the collected mechanically separated inorganic fibers into a second forming chamber that comprises a plurality of second fiber-separating rollers provided in at least one row within the second forming chamber and that comprises a second moving endless belt screen; mechanically separating at least some of the inorganic fibers with the second fiber-separating rollers of the second forming chamber; capturing any remaining agglomerates of the inorganic fibers by the second moving endless belt screen and returning the captured agglomerates to the second fiber-separating rollers to be mechanically separated by the second fiber-separating rollers; collecting the mechanically separated inorganic fibers as a gravity-laid inorganic fiber mat; removing the gravity-laid inorganic fiber mat from the second forming chamber; and, consolidating the gravity-laid inorganic fiber mat to form a gravity-laid inorganic fiber web.

Embodiment 2. The method of embodiment 1 wherein the mechanically separated inorganic fibers that are collected from the first forming chamber are not baled before being introduced into the second forming chamber.

Embodiment 3. The method of embodiment 2 wherein the second forming chamber is in tandem with the first forming chamber in a single production line.

Embodiment 4. The method of any of embodiments 1-3 wherein in the second forming chamber the mechanically separated inorganic fibers collected from the first forming chamber are blended with at least one additional type of inorganic fiber that is introduced into the second forming chamber and that differs in composition from the mechanically separated inorganic fibers collected from the first forming chamber.

Embodiment 5. The method of embodiment 4 wherein the inorganic fibers introduced into the first forming chamber are long inorganic fibers and wherein the additional type of inorganic fibers are short inorganic fibers.

Embodiment 6. The method of embodiment 5 wherein the long inorganic fibers are chosen from the group consisting of long basalt fibers, long biosoluble ceramic fibers, and long glass fibers.

Embodiment 7. The method of any of embodiments 1-6 further comprising adding at least one binder to the collected mechanically separated inorganic fibers or adding at least one binder to the gravity-laid inorganic fiber mat, wherein the consolidation is performed by activating the binder.

Embodiment 8. The method of embodiment 7 wherein the binder is an inorganic binder.

Embodiment 9. The method of any of embodiments 1-8 further comprising introducing at least one inorganic particulate additive into the second forming chamber and blending the additive with the inorganic fibers.

Embodiment 10. The method of embodiment 9 wherein the inorganic particulate additive comprises an intumescent additive.

Embodiment 11. The method of any of embodiments 9-10 wherein the inorganic particulate additive comprises an endothermic additive comprising an inorganic compound capable of liberating water at temperatures of between 200° C. and 600° C.

Embodiment 12. The method of any of embodiments 9-11 wherein the inorganic particulate additive comprises an insulative additive.

Embodiment 13. The method of any of embodiments 9-12 further comprising introducing at least one binder into the second forming chamber and blending the binder with the inorganic fibers and the inorganic particulate additive, and wherein the consolidation serves to bind the inorganic particulate additive within the inorganic fiber web by way of the binder.

Embodiment 14. The method of embodiment 13 wherein the binder is an inorganic binder.

Embodiment 15. A method of making a multilayer gravity-laid inorganic fiber web, comprising: introducing first inorganic fibers into a first forming chamber that comprises a plurality of first fiber-separating rollers provided in at least one row within the first forming chamber and that comprises a first moving endless belt screen; mechanically separating at least some of the first inorganic fibers with the first fiber-separating rollers; capturing any remaining agglomerates of the first inorganic fibers by the first moving endless belt screen and returning the captured agglomerates to the first fiber-separating rollers to be mechanically separated by the first fiber-separating rollers; collecting the mechanically separated first inorganic fibers as a first gravity-laid inorganic fiber mat layer; removing the first gravity-laid inorganic fiber mat layer from the first forming chamber; introducing the first gravity-laid inorganic fiber mat layer into a second forming chamber, on a carrier at the bottom of the second forming chamber; introducing second inorganic fibers into the second forming chamber, wherein the second forming chamber comprises a plurality of second fiber-separating rollers provided in at least one row within the second forming chamber and that comprises a second moving endless belt screen; mechanically separating at least some of the second inorganic fibers with the second fiber-separating rollers of the second forming chamber; capturing any remaining agglomerates of the second inorganic fibers by the second moving endless belt screen and returning the captured agglomerates to the second fiber-separating rollers to be mechanically separated by the second fiber-separating rollers; collecting the mechanically separated second inorganic fibers as a second gravity-laid inorganic fiber mat layer atop the first gravity-laid inorganic fiber mat layer, to form a multilayer gravity-laid inorganic fiber mat; removing the multilayer gravity-laid inorganic fiber mat from the second forming chamber; and, consolidating the first gravity-laid inorganic fiber mat layer and the second gravity-laid inorganic fiber mat layer to respectively form first and second gravity-laid inorganic web layers of a multilayer gravity-laid inorganic fiber web.

Embodiment 16. The method of embodiment 15 wherein the inorganic fibers of the first inorganic fiber mat layer are not baled before being introduced into the second forming chamber.

Embodiment 17 The method of embodiment 16 wherein the second forming chamber is in tandem with the first forming chamber in a single production line.

Embodiment 18. The method of any of embodiments 15-17 wherein the first inorganic fiber mat layer is not consolidated prior to being introduced into the second forming chamber and wherein the first inorganic fiber mat layer is consolidated in the same step as the consolidation of the second inorganic fiber mat layer.

Embodiment 19. The method of any of embodiments 15-17 wherein the first inorganic fiber mat layer is at least partially consolidated prior to being introduced into the second forming chamber.

Embodiment 20. The method of any of embodiments 15-19 wherein the multilayer gravity-laid inorganic fiber mat is needle-punched to consolidate both of the inorganic fiber mat layers and to secure the inorganic fiber mat layers to each other.

Embodiment 21. The method of any of embodiments 15-19 wherein the first inorganic fiber mat layer comprises a binder and wherein the second inorganic fiber mat layer comprises a binder, and wherein consolidation by activation of the binders serves to consolidate each of the first and second inorganic fiber mat layers and also serves to secure the first and second inorganic fiber mat layers to each other.

Embodiment 22. The method of any of embodiments 15-21 wherein the first inorganic fibers of the first inorganic fiber mat layer differ in composition from the second inorganic fibers of the second inorganic fiber mat layer.

Embodiment 23. The method of embodiment 22 wherein the first inorganic fiber mat layer comprises biosoluble ceramic fibers and wherein the second inorganic fiber mat layer comprises mineral wool.

Embodiment 24. A multilayer inorganic fiber web comprising: a first gravity-laid inorganic fiber web layer of a first composition and with first and second oppositely-facing major surfaces; and, a second gravity-laid inorganic fiber web layer of a second composition and with first and second oppositely-facing major surfaces, wherein the first and second gravity-laid inorganic web layers are bonded together.

Embodiment 25. The multilayer web of embodiment 24 wherein the first gravity-laid inorganic fiber web layer comprises biosoluble ceramic fibers and wherein the second gravity-laid inorganic fiber web layer does not comprise biosoluble ceramic fibers.

Embodiment 26. The multilayer web of embodiment 25 wherein the second gravity-laid inorganic fiber web layer comprises mineral wool fibers.

Embodiment 27. The multilayer web of any of embodiments 24-26 wherein the first gravity-laid inorganic fiber web layer comprises organic binder and wherein the second gravity-laid inorganic fiber web layer does not comprise organic binder.

Embodiment 28. The multilayer web of any of embodiments 24-27 wherein the first gravity-laid inorganic fiber web layer comprises an intumescent additive and wherein the second gravity-laid inorganic fiber web layer does not comprise an intumescent additive.

Embodiment 29. The multilayer web of any of embodiments 24-28 wherein the first and second gravity-laid inorganic web layers are bonded together by way of fibers of the first web layer at the first surface of the first web layer being bonded to fibers of the second web layer at the first surface of the second web layer.

Embodiment 30. The multilayer web of any of embodiments 24-29 wherein the first and second gravity-laid inorganic web layers are bonded together by way of at least some of the fibers of each web layer being needle-punched so that fibers of the first web layer are entangled with fibers of the second web layer.

EXAMPLE

While not using two separate forming chambers e.g. in tandem, the following example illustrates sequentially passing inorganic fibers multiple times through a single forming chamber in order to demonstrate the usefulness of one or more passes through a forming chamber to open fibers, prior to a final passage in which the fibers are collected (and optionally blended with other fibers and/or particulate additives) and are then consolidated.

A forming chamber was used of the general type depicted as forming chamber 2 in FIG. 1. The forming chamber contained two rows of fiber-separating rotating (spike) rolls arranged near each other in the upper part of the chamber and with two rows of spike rolls arranged near each other in the lower part of the chamber, in similar manner as shown in FIG. 1. Each row contained five spike rolls. An endless belt ran around the interior of the chamber, passing between the upper and lower sets of spike roll rows, in similar manner as shown in FIG. 1. The belt comprised solid metal slats with their long axis oriented transversely to the direction of movement of the belt, spaced so as to provide transversely-extending throughholes of width approximately one inch (in the direction of movement of the belt). The bottom of the forming chamber comprised an area approximately 75 cm long (in the direction of motion of the formed fiber mat) and approximately 60 cm wide. A carrier (an endless, air-permeable belt) was arranged to pass horizontally along the bottom of the forming chamber. The carrier was approximately 60 cm wide, to generally match the width of the bottom of the forming chamber, and was movable in the direction of the long axis of the bottom of the forming chamber. A disposable, air-permeable paper (of basis weight in the range of approximately 18 grams per square meter) was placed on the top surface of the carrier. Biosoluble ceramic fibers were obtained from Nutec/Fibratec (Monterrey, Mexico) under the trade designation SMG 1200. The biosoluble ceramic fibers were reported by the supplier to be amorphous calcium-magnesium silicate fibers with a nominal fiber length of approximately 20 cm and a nominal fiber diameter of approximately 3 μm (qualitatively, the fibers as-received appeared to be shorter than the nominal length). Basalt fibers were obtained from Kamenny Vek, of Dubna, Moscow, Russian Federation, under the trade designation BCS13-KV12. The basalt fibers were reported by the supplier to be chopped fibers with a nominal fiber length of approximately 6.4 cm and a nominal fiber diameter of approximately 13 μm. Expandable graphite was obtained from Nordmann-Rassmann, Hamburg, Germany, under the trade designation NORD-MIN 351. Bicomponent organic polymer (binder) fibers were obtained from Stein Fibers (Albany, N.Y.) under the trade designation 131-00251. The fibers were reported by the supplier to be polyester/copolyester 2 denier fibers of nominal length of 55 mm.

In performing the experiments, basalt fibers were obtained as bulk fibers in compressed bales. The basalt fibers were opened by the following procedures. The basalt fibers were measured out and manually placed on a feed conveyor belt. A water mister was used in the room containing the apparatus, to reduce static electricity for convenience of handling the fibers. The conveyor belt was started into motion and carried the basalt fibers to a fiber feeding station comprising a chamber containing a single set of two spike rollers. The basalt fibers were drawn into the chamber, passed through the set of spike rollers, and were removed from the chamber through a duct, by way of a partial vacuum imparted by blower fans. The basalt fibers were then conveyed to, and injected into, the upper portion of the forming chamber under positive pressure imparted by the blower fans. The ceiling of the forming chamber was porous so that any excess pressure could be bled off.

In the forming chamber, the basalt fibers were mechanically separated in similar manner as described earlier herein. The mechanically-separated basalt fibers were gravity-dropped toward the bottom of the forming chamber (with capture and recirculation of any large agglomerates as described earlier herein) to fall onto an air-permeable paper, as the paper moved (atop the carrier) across the bottom of the forming chamber at a speed of approximately 1 meter per minute. A partial vacuum was applied to the underside of the carrier to assist in depositing the basalt fibers and in holding the deposited basalt fibers on the porous paper. The paper/ carrier carried the deposited basalt fibers out of the forming chamber. The opened basalt fibers were then returned to the feed conveyor belt and placed thereon along with appropriate amounts of the ceramic fibers and the organic binder fibers.

The mixture of fibers were then conveyed into the forming chamber in similar manner as described above. Expandable graphite particles were placed into the hopper of a particle injection unit, which injected the particles into the lower portion of the forming chamber (below the spike rollers) at a rate calibrated to provide the compositions listed below.

The amounts of the various fibers, and of the particles, were controlled so as to form a fibrous mat of nominal composition approximately 25% by weight expandable graphite, approximately 20% by weight basalt, approximately 50% by weight ceramic fibers, and approximately 5% by weight of organic binder fibers. In the forming chamber, the biosoluble ceramic fibers and the basalt fibers were each mechanically separated, were blended with each other, and were blended with the binder fibers, in similar manner to that described earlier herein. The mechanically-separated and blended fibers were gravity-dropped toward the bottom of the forming chamber (with capture and recirculation of any large agglomerates as described above) and were blended with the graphite particles, with the blended fibers and particles falling onto the air-permeable paper to form a fiber mat, as the paper moved (atop the carrier) across the bottom of the forming chamber at a speed of approximately 1 meter per minute. A partial vacuum was applied to the underside of the carrier to assist in depositing the materials and in holding the deposited mat on the porous paper. The paper/carrier carried the deposited fiber mat out of the forming chamber. A compression roll was provided at the chamber exit, which momentarily compressed the fiber mat as it exited the chamber. The as-deposited thickness of the fiber mat was estimated to be approximately 8.9 cm.

The fiber mat was fed through an oven at a speed of approximately 1 meter per minute. The oven was maintained at a temperature of approximately 154 ° C. The length of the oven was approximately 5.5 meters, and the residence time of the fiber mat in the oven was approximately 5.5 minutes. The oven was arranged to direct heated air downward onto the fiber mat, with the mat being on a porous carrier with a partial vacuum applied to the underside of the carrier. In this manner the heated air could be drawn through the fiber mat, thus pinning the mat against the carrier rather than dislodging the fibers, until the fibers were bonded together.

The activation of the binder fiber by the elevated temperature resulted in the consolidation of the fiber mat into a self-supporting web. At the exit of the oven was roll that could be set so as to momentarily compress the web to a desired amount. In this experiment, the roll was set so as not to compress the web. The final thickness of the thus-formed gravity-laid inorganic fiber web was approximately 8.9 cm. The bulk density of the web was approximately 0.021 grams per $cm^3$.

The tests and test results described above are intended solely to be illustrative, rather than predictive, and variations in the testing procedure can be expected to yield different results. All quantitative values in the Examples section are understood to be approximate in view of the commonly known tolerances involved in the procedures used.

The foregoing detailed description and examples have been given for clarity of understanding only. No unnecessary limitations are to be understood therefrom.

It will be apparent to those skilled in the art that the specific exemplary structures, features, details, configurations, etc., that are disclosed herein can be modified and/or combined in numerous embodiments. All such variations and combinations are contemplated by the inventor as being within the bounds of the conceived invention. Thus, the scope of the present invention should not be limited to the specific illustrative structures described herein, but rather by the structures described by the language of the claims, and the equivalents of those structures. To the extent that there is a conflict or discrepancy between this specification and the disclosure in any document incorporated by reference herein, this specification will control.

What is claimed is:

1. A method of making a gravity-laid inorganic fiber web, comprising:
    introducing inorganic fibers into a first forming chamber that comprises a plurality of first fiber-separating rollers provided in at least one row within the first forming chamber and that comprises a first moving endless belt screen;
    mechanically separating at least some of the inorganic fibers with the first fiber-separating rollers;
    capturing any remaining agglomerates of the inorganic fibers by the first moving endless belt screen and returning the captured agglomerates to the first fiber-separating rollers to be mechanically separated by the first fiber-separating rollers;
    collecting the mechanically separated inorganic fibers;
    introducing at least some of the collected mechanically separated inorganic fibers into a second forming chamber that comprises a plurality of second fiber-separating rollers provided in at least one row within the second forming chamber and that comprises a second moving endless belt screen;
    mechanically separating at least some of the inorganic fibers with the second fiber-separating rollers of the second forming chamber;
    capturing any remaining agglomerates of the inorganic fibers by the second moving endless belt screen and returning the captured agglomerates to the second fiber-separating rollers to be mechanically separated by the second fiber-separating rollers;
    collecting the mechanically separated inorganic fibers as a gravity-laid inorganic fiber mat;
    removing the gravity-laid inorganic fiber mat from the second forming chamber;
    and,
    consolidating the gravity-laid inorganic fiber mat to form a gravity-laid inorganic fiber web.

2. The method of claim 1 wherein the mechanically separated inorganic fibers that are collected from the first forming chamber are not baled before being introduced into the second forming chamber.

3. The method of claim 2 wherein the second forming chamber is in tandem with the first forming chamber in a single production line.

4. The method of claim 1 wherein in the second forming chamber the mechanically separated inorganic fibers collected from the first forming chamber are blended with at least one additional type of inorganic fiber that is introduced into the second forming chamber and that differs in composition from the mechanically separated inorganic fibers collected from the first forming chamber.

5. The method of claim 4 wherein the inorganic fibers introduced into the first forming chamber are long inorganic fibers and wherein the additional type of inorganic fibers are short inorganic fibers.

6. The method of claim 5 wherein the long inorganic fibers are chosen from the group consisting of long basalt fibers, long biosoluble ceramic fibers, and long glass fibers.

7. The method of claim 1 further comprising adding at least one binder to the collected mechanically separated inorganic fibers or adding at least one binder to the gravity-laid inorganic fiber mat, wherein the consolidation is performed by activating the binder.

8. The method of claim 7 wherein the binder is an inorganic binder.

9. The method of claim 1 further comprising introducing at least one inorganic particulate additive into the second forming chamber and blending the additive with the inorganic fibers.

10. A method of making a multilayer gravity-laid inorganic fiber web, comprising:
- introducing first inorganic fibers into a first forming chamber that comprises a plurality of first fiber-separating rollers provided in at least one row within the first forming chamber and that comprises a first moving endless belt screen;
- mechanically separating at least some of the first inorganic fibers with the first fiber-separating rollers;
- capturing any remaining agglomerates of the first inorganic fibers by the first moving endless belt screen and returning the captured agglomerates to the first fiber-separating rollers to be mechanically separated by the first fiber-separating rollers;
- collecting the mechanically separated first inorganic fibers as a first gravity-laid inorganic fiber mat layer;
- removing the first gravity-laid inorganic fiber mat layer from the first forming chamber;
- introducing the first gravity-laid inorganic fiber mat layer into a second forming chamber, on a carrier at the bottom of the second forming chamber;
- introducing second inorganic fibers into the second forming chamber, wherein the second forming chamber comprises a plurality of second fiber-separating rollers provided in at least one row within the second forming chamber and that comprises a second moving endless belt screen;
- mechanically separating at least some of the second inorganic fibers with the second fiber-separating rollers of the second forming chamber;
- capturing any remaining agglomerates of the second inorganic fibers by the second moving endless belt screen and returning the captured agglomerates to the second fiber-separating rollers to be mechanically separated by the second fiber-separating rollers;
- collecting the mechanically separated second inorganic fibers as a second gravity-laid inorganic fiber mat layer atop the first gravity-laid inorganic fiber mat layer, to form a multilayer gravity-laid inorganic fiber mat;
- removing the multilayer gravity-laid inorganic fiber mat from the second forming chamber;
and,
- consolidating the first gravity-laid inorganic fiber mat layer and the second gravity-laid inorganic fiber mat layer to respectively form first and second gravity-laid inorganic web layers of a multilayer gravity-laid inorganic fiber web.

11. The method of claim 10 wherein the inorganic fibers of the first inorganic fiber mat layer are not baled before being introduced into the second forming chamber.

12. The method of claim 11 wherein the second forming chamber is in tandem with the first forming chamber in a single production line.

13. The method of claim 10 wherein the first inorganic fiber mat layer is not consolidated prior to being introduced into the second forming chamber and wherein the first inorganic fiber mat layer is consolidated in the same step as the consolidation of the second inorganic fiber mat layer.

14. The method of claim 10 wherein the first inorganic fiber mat layer is at least partially consolidated prior to being introduced into the second forming chamber.

15. The method of claim 10 wherein the first inorganic fiber mat layer comprises a binder and wherein the second inorganic fiber mat layer comprises a binder, and wherein consolidation by activation of the binders serves to consolidate each of the first and second inorganic fiber mat layers and also serves to secure the first and second inorganic fiber mat layers to each other.

* * * * *

UNITED STATES PATENT AND TRADEMARK OFFICE
CERTIFICATE OF CORRECTION

Page 1 of 1

PATENT NO. : 8,562,879 B2
APPLICATION NO. : 13/079885
DATED : October 22, 2013
INVENTOR(S) : George W. Frost et al.

It is certified that error appears in the above-identified patent and that said Letters Patent is hereby corrected as shown below:

In the Specification

Column 7
Line 27, Delete "61/323,425," and insert -- 61/323,425, attorney docket number 66305US002, --, therefor.

Column 8
Line 45, Delete "tacking)" and insert -- tacking). --, therefor.

Column 17
Line 43, Delete "61/323,531," and insert -- 61/323,531, attorney docket number 66309US002, --, therefor.

Column 19
Line 66, Delete "61/323,425," and insert -- 61/323,425, attorney docket number 66305US002, --, therefor.

Column 21
Line 39, Delete "6.The" and insert -- 6. The --, therefor.

Column 22
Line 50, Delete "17The" and insert -- 17. The --, therefor.

Signed and Sealed this
Eighteenth Day of March, 2014

Michelle K. Lee
*Deputy Director of the United States Patent and Trademark Office*